United States Patent [19]

Limper et al.

[11] 4,135,210
[45] Jan. 16, 1979

[54] TELEVISION CAMERA TUBE WITH CENTERING MEANS

[75] Inventors: Nicolaas H. Limper; Willem J. Lohuis, both of Eindhoven, Netherlands

[73] Assignee: U.S. Philips Corporation, New York, N.Y.

[21] Appl. No.: 686,092

[22] Filed: May 13, 1976

[30] Foreign Application Priority Data

May 26, 1975 [NL] Netherlands ............... 7506138

[51] Int. Cl.² ............................................. H04N 5/26
[52] U.S. Cl. ..................................... 358/217; 358/229; 358/248
[58] Field of Search ............... 358/217, 248, 249, 229

[56] References Cited

U.S. PATENT DOCUMENTS

| | | | |
|---|---|---|---|
| 2,877,368 | 3/1959 | Sheldon | 358/217 |
| 3,008,002 | 11/1961 | Kingsbury | 358/229 |
| 3,712,604 | 1/1973 | Nation | 358/229 |
| 3,751,703 | 8/1973 | Weijland | 358/217 |

*Primary Examiner*—Howard W. Britton
*Attorney, Agent, or Firm*—Frank R. Trifari; C. P. Steinhauser

[57] ABSTRACT

A television camera having a camera tube provided with centering means for centering the camera tube in a coil former. One type of camera tube is thus suitable for a plurality of types of camera and can be made suitable for the relevant camera by a suitable choice of the centering means to be provided at a later stage.

4 Claims, 4 Drawing Figures

TELEVISION CAMERA TUBE WITH CENTERING MEANS

The invention relates to a television camera tube for insertion into a coil housing having adjusting means, of a television camera.

Two methods are commonly used for mounting camera tubes in the coil housing of a television camera, i.e. one method where the tube is slid from the rear into a coil former in a camera of the rear-loading type, and one method where the tube is slid from the front into a coil former in a camera of the front-loading type. The construction of these cameras is such that for each type only one method of mounting the camera tube is feasible; consequently, it is necessary to have two different pick-up tubes adapted to the different camera types available. These pick-up tubes cannot be interchanged. For the camera tube for the rear-loading type it is not permissible to have a radially projecting structural element on the window side. This is permissible for the front-loading type, and this possibility is utilized in that on the camera tube centering means are provided for centering the camera tube in the coil former of the camera.

The invention has for its object to provide a method which enables the use of a single type of camera tube for both types of camera. To this end, a camera tube in accordance with the invention is characterized in that, after having been arranged in the coil former, the pick-up tube is provided with centering means adapted to the adjusting means of the coil former.

Because the camera tube in accordance with the invention enables the tube to be used in a camera of the front-loading type as well as in a camera of the rear-loading type, a distinction need no longer be made during the production of pick-up tubes, that is to say a single type suffices in this respect.

In a preferred embodiment in accordance with the invention, the centering means to be separately fitted consists of a centering ring which can be slid about the entrance window with a suitable fit. In a further preferred embodiment, the centering means to be separately fitted consists of a clamping ring which is clamped about the end of the cylindrical portion of the tube and hence about the signal electrode contact.

Some preferred embodiments of a television camera tube in accordance with the invention and the method of assembling the same will be described in detail hereinafter with reference to the drawing.

Figure 1:
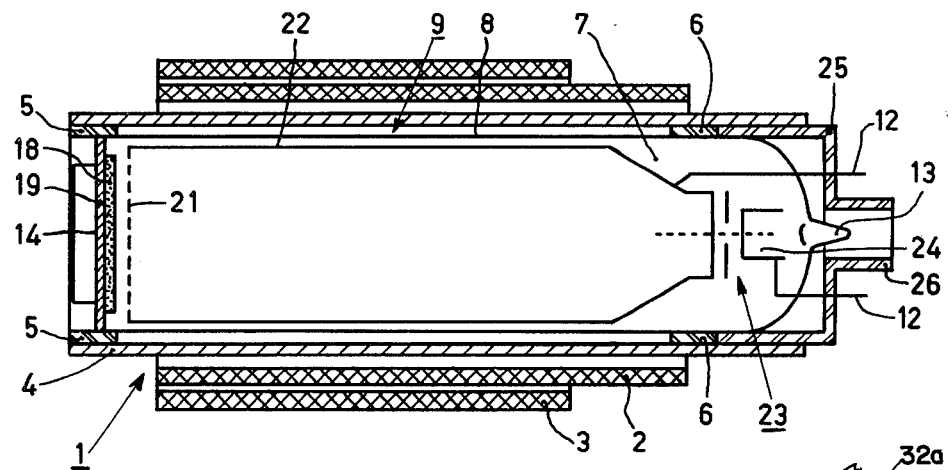
FIG. 1 is a simplified diagrammatic view of the relevant portion of a television camera with a camera tube.

FIG. 1 shows a portion relevant for the application of the invention of a television camera comprising a coil unit which includes, for example, a line deflection coil 2 and a frame deflection coil 3 which are both disposed on a coil former 4. In the coil former there are provided adjusting means 5 and 6 for securing a camera tube 7 in the coil former. The camera tube, that is to say the optical axis of the camera tube, can be orientated, axially displaced and possibly rotated by means of these adjusting means. Depending on the type of camera, either the adjusting means 5, situated on the entrance side of the camera tube, or the adjusting means 6, situated on the tube base side of the camera tube, are usually shaped as a flexible ring, the said ring lightly clamping a cylindrical portion 8 of an envelope 9 of the camera tube. The adjusting means situated at the axially opposite end of the camera tube then comprise the necessary auxiliaries for readjustment of the tube. These readjusting means are included in many known cameras and are not shown in the drawing.

Figure 2A:
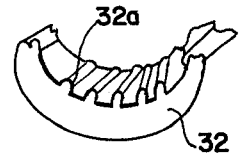
FIGS. 2, 2a and 3 show different embodiments of television camera tubes with mounting means in accordance with the invention.
Figure 2:
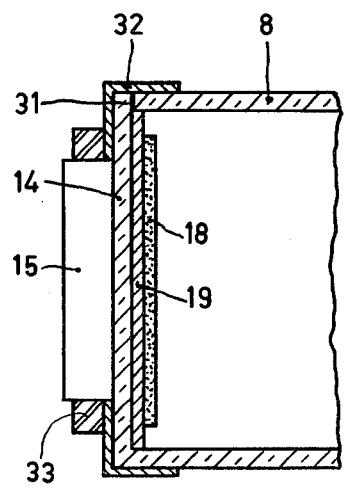
Figure 3:
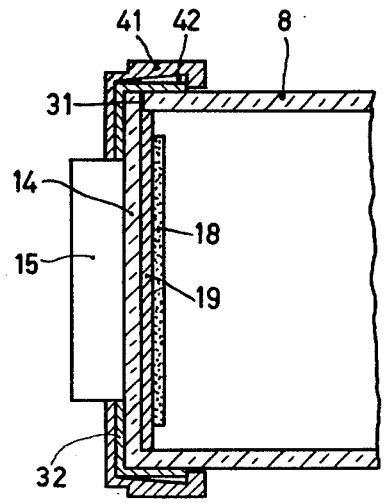

The envelope 9 furthermore comprises a tube base 25 which comprises passage pins 12, a pumping stem 13 and an entrance window 14. The entrance window 14 may be composed of an optical fiber plate as well as of a homogeneous glass plate. When a homogeneous glass plate is used for the entrance window, usually a front attachment is added which preferably has a thickness such that the disturbing effects of internal reflections and dust present on the inner side of the lens on the imaging are minimized. The diameter of an entrance window thus formed is usually smaller than the diameter of the cylindrical portion 8 of the envelope. As is shown in FIGS. 2 and 3, on the entrance side of the camera tube there is provided a signal electrode contact 31, for example, in the form of one or a few passages which are electrically conductively connected to a contact ring 32 disposed about the entrance portion of the cylindrical housing. The tube camera has a target plate which comprises, for example, a layer 18 of lead monoxide as the photosensitive material and a signal electrode 19 which is preferably arranged on the entrance window. The camera tube furthermore comprises a gauze electrode 21, an output electrode 22 and an electron source 23 having a cathode 24. The required voltages can be applied via a base 25 which may comprise a bush 26 for accommodating an auxiliary illumination source which is not shown. FIG. 2 is a simplified diagrammatic representation of a front portion of a camera tube with the cylindrical tube wall portion 8 and the entrance window 14 which both form part of the envelope of the camera tube. The tube accommodates the signal electrode 19 and the photoconductive layer 18 of the target. The signal electrode 19 is connected, via an electrically conductive glass passage 31, to the contact ring 32 fitted about the end of the cylindrical portion of the envelope. This contact ring is integral with the camera tube and is provided, for example, by vapour-deposition, baking or an other method suitable for the deposition of a conductive material on glass. This contact ring is constructed to be so thin, also for known camera tubes, that the tube is suitable for a camera of the rear-loading type. However, the camera tube lacks the required centering means for use in a camera of the front-loading type. These means are constructed in this embodiment as a ring 33 which is preferably made of synthetic material and which can be slid about the front attachment of the entrance window in a clamping fashion. The tube then remains suitable for use in a camera of the rear-loading type, but still includes a centering member on the entrance side. The contact ring remains accessible for a spring contact, present in the coil former, for the output of the video signal. The centering ring is preferably provided on its inner side with ridge-like, axially extending raised portions 32a (FIG. 2a) which are regularly distributed along its circumference and which are partly cut away upon insertion, so that the ring occupies an exactly defined position about the window. If desired, the ring can be provided on its outer side with structural parts adapted to the centering means of the relevant coil former, but for the most commonly used cameras a simple ring already offers an adequate centering facility. The ring can be constructed to be exchangeable, but in order to avoid asymmetrical mounting, the use of a new ring after each removal is to be preferred.

FIG. 3 shows a camera tube which is suitable for a camera of the front-loading type and which has been obtained, using the same tube construction, by the provision of a ring 41 by means of a snap-lock 42. The ring 41 is preferably made of metal or an other electrically conductive material, so that the contact with the signal electrode can be established via this ring. The outer diameter of the ring, and possibly also its shape, has been adapted to the centering means of the relevant coil former.

What is claimed is:

1. In a television camera, a camera tube, a coil former surrounding said camera tube, and adjusting means in said coil former for securing the camera within the coil former, the improvement wherein adapted for insertion into opposite ends of said coil former and centering means are positioned about an end of the tube whereby the camera tube is insertable into either end of said coil former.

2. A television camera tube as claimed in claim 1, wherein the centering means for the camera tube comprises an electrically conductive ring positioned about a portion of the camera tube which adjoins the entrance window and which supports a signal electrode contact.

3. A television camera tube as claimed in claim 1, wherein the centering means for the camera tube is a ring of synthetic material which is positioned about an entrance window of the camera tube with a suitable fit.

4. A television camera tube as claimed in claim 3 wherein the ring of synthetic material has a plurality of ridge-like, axially extending raised portions regularly distributed along its inner circumference.

* * * * *